(12) United States Patent
de Wit

(10) Patent No.: US 7,571,799 B2
(45) Date of Patent: Aug. 11, 2009

(54) FEEDING STATION FOR PROCESSING BULBOUS FLOWERS

(75) Inventor: Gerardus Johannes J. de Wit, Bovenkarspel (NL)

(73) Assignee: Germaco B.V., Bovenkarspel (NL)

( * ) Notice: Subject to any disclaimer, the term of this patent is extended or adjusted under 35 U.S.C. 154(b) by 0 days.

(21) Appl. No.: 10/469,019

(22) PCT Filed: Feb. 25, 2002

(86) PCT No.: PCT/NL02/00121

§ 371 (c)(1),
(2), (4) Date: Apr. 9, 2004

(87) PCT Pub. No.: WO02/067659

PCT Pub. Date: Sep. 6, 2002

(65) Prior Publication Data

US 2004/0154221 A1    Aug. 12, 2004

(30) Foreign Application Priority Data

Feb. 26, 2001    (NL) .................................... 1017452

(51) Int. Cl.
  *B65G 29/00*    (2006.01)
  *A01G 5/02*    (2006.01)
(52) U.S. Cl. .................. 198/466.1; 198/626.1; 111/105

(58) Field of Classification Search .............. 198/626.1, 198/465.4, 466.1; 111/104, 105
See application file for complete search history.

(56) References Cited

U.S. PATENT DOCUMENTS

| 3,659,709 | A | * | 5/1972 | Bartlett et al. ............... 209/551 |
| 3,719,158 | A | * | 3/1973 | Roths .......................... 111/105 |
| 4,167,911 | A | * | 9/1979 | Masuda et al. .............. 111/105 |
| 5,160,235 | A | * | 11/1992 | Bikow .................... 414/416.05 |
| 5,170,879 | A | * | 12/1992 | Smith .......................... 198/452 |
| 5,201,910 | A | * | 4/1993 | Sheeter ..................... 198/347.3 |
| 5,568,850 | A | * | 10/1996 | Neber ...................... 198/347.1 |
| 5,996,513 | A | * | 12/1999 | Nanbu et al. ................ 111/105 |
| 6,415,902 | B1 | * | 7/2002 | Vis et al. ..................... 198/384 |

* cited by examiner

*Primary Examiner*—Douglas A Hess
(74) *Attorney, Agent, or Firm*—Varnum, Riddering, Schmidt & Howlett LLP

(57) ABSTRACT

A feeding station for processing bulbous flowers comprises a conveyor unit with suspension elements provided at discrete mutual distances and at least one feeding unit (3) with a guiding mechanism (4) for guiding, for instance by hand, flowers suspended in the guiding mechanism (4) with the bulbs upward to the conveyor unit and to take over the flowers therein in this position. Below the guiding mechanism (4) an actuator (12) is provided to place the bulbous flowers in the suspension elements (1) of the conveyor unit while seizing the stems. Preferably, a suspension element (1) is provided with a lock, which, dining the takeover of bulbous flowers in a suspension element (1), is released for the time required to affect the takeover of the flower in the suspension element (1).

5 Claims, 2 Drawing Sheets

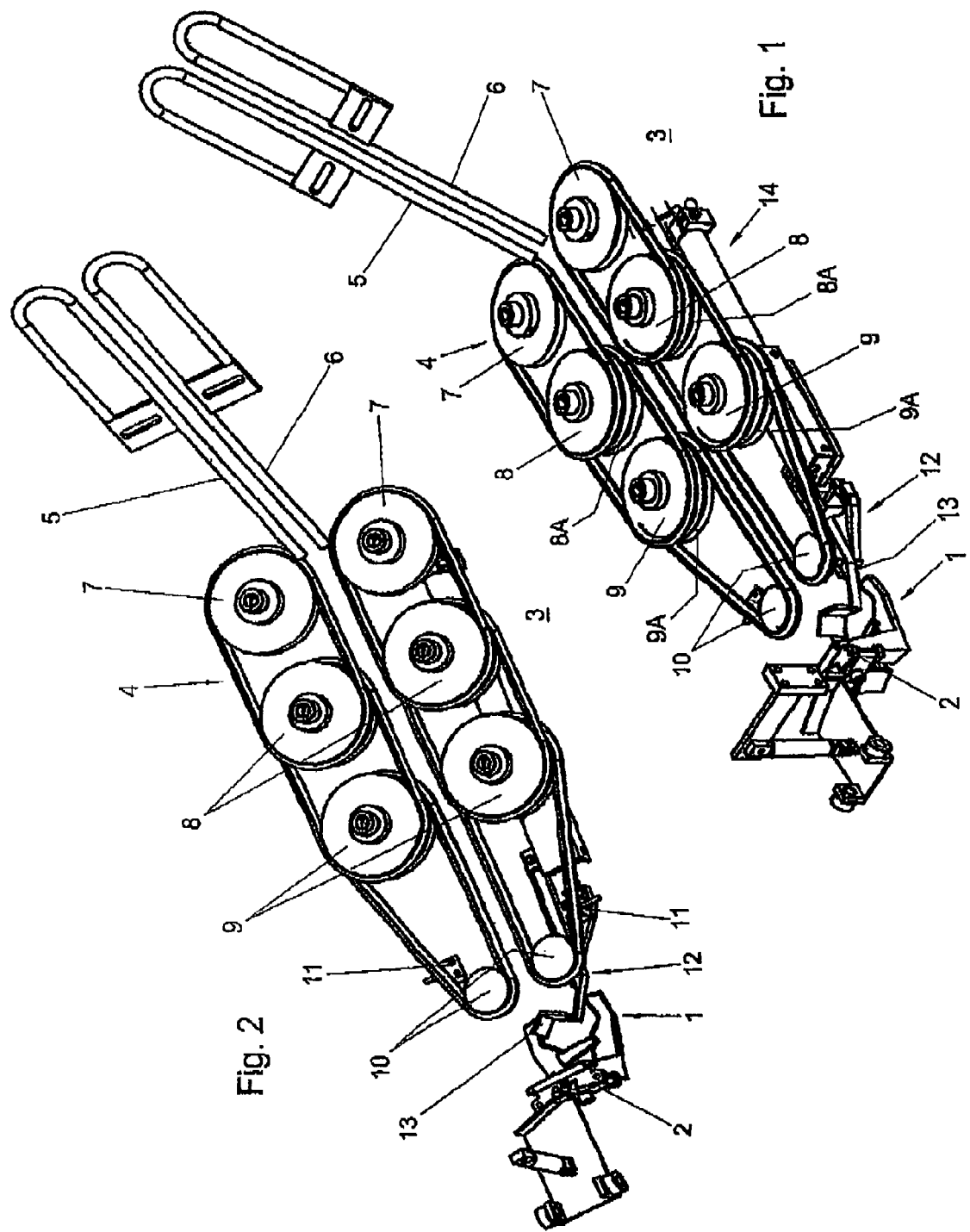

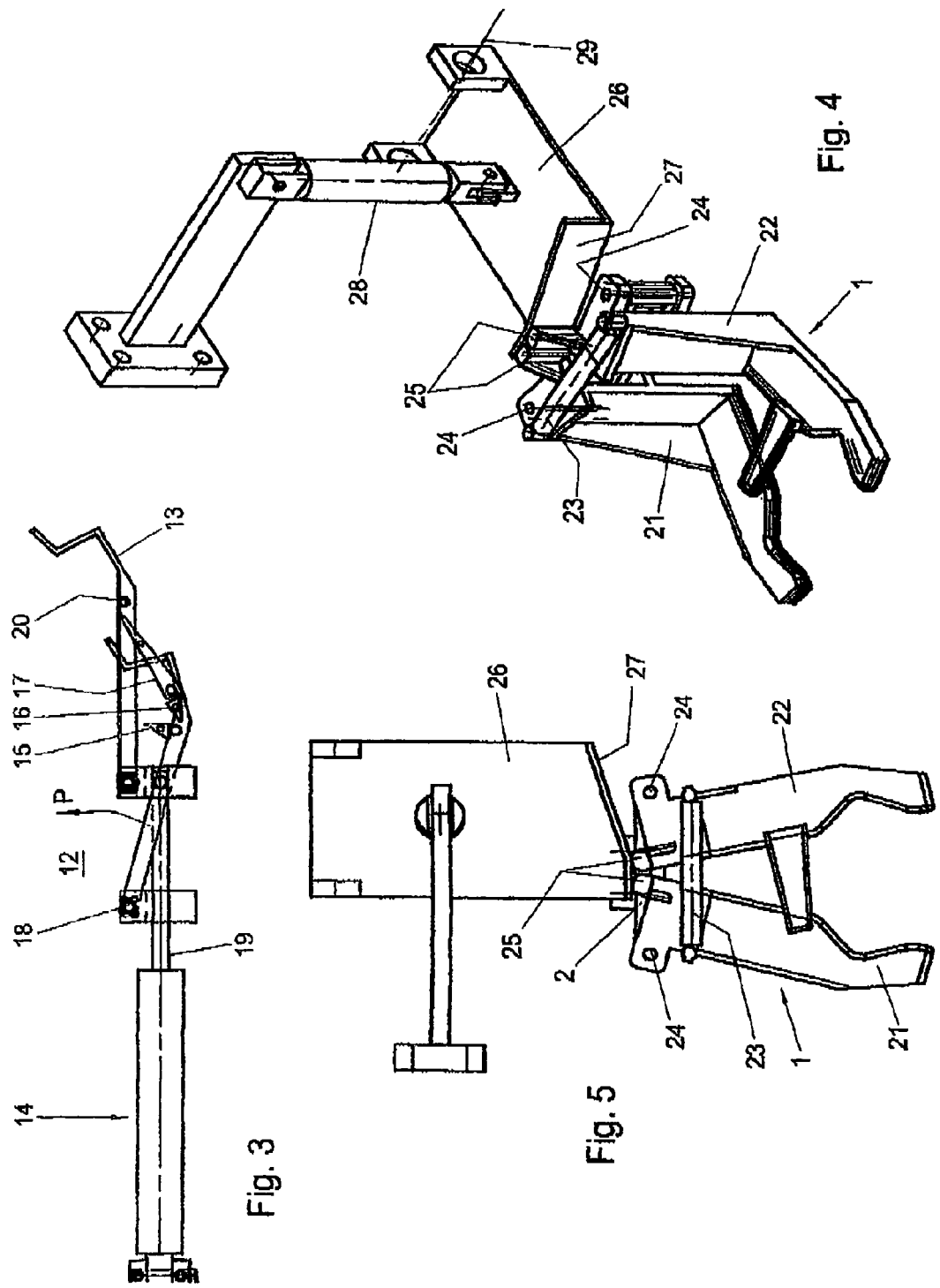

FEEDING STATION FOR PROCESSING BULBOUS FLOWERS

The present invention relates to a feeding station for processing bulbous flowers, in particular for a bulbous flower machine, comprising a conveyor unit with suspension elements provided at discrete mutual distances and at least one feeding unit with a guiding mechanism for guiding, for instance by hand, flowers suspended in the guiding mechanism with the bulbs upward to the conveyor unit and to take over the flowers therein in this position.

Such a feeding station is known from Netherlands patent application 10.12981. This patent application describes a flower-bunching machine with a feeding station, in which the bulbous flowers moved via the conveyor unit, in particular tulips, are guided to a bulb-removing apparatus so as to be arranged subsequently to bouquets and to be bunched. In this feeding station the conveyor it is formed by a chain with V-shaped or slot-shaped links, in which the bulbous flowers could be suspended.

The feeding station described in this patent application appeared to have a number of deficiencies. The feeding station was provided with a brush element to effect the takeover of bulbous flowers from between belts of an accelerating mechanism in the V-shaped or slot-shaped links. The bulbous flowers are seized therein at the bulbs by the brush elements, which caused problems because between the belts of the accelerating mechanism the bulbous flowers could lie with the bulbs against each other. Moreover, a root wig with soil is attached to the bulb, as a result of which the seizure of the bulb of the bulb is not defined very well. It further appeared to be a problem that the bulbous flowers suspended in the V-shaped or slot-shaped links could easily fall out of them.

The object of the invention is to solve at least one of these, but preferably both problems at least to a substantial extent and to provide a feeding station in which, in an efficient and reliable manner, the bulbous flowers fed can be taken over in the conveyor unit at mutually discrete distances with the bulbs upward and can be moved further for the purpose of further processing.

To solve the first of the above problems at least to a substantial extent, the feeding station as described in the opening paragraph is characterized according to the invention in that below the guiding mechanism an actuator is provided so as to be able to place the bulbous flowers in the suspension elements of the conveyor unit while seizing the stems.

To solve the second of the above problems at least to a substantial extent, the feeding station is characterized according to the invention in that the suspension elements are provided with a lock, which, during the takeover of a bulbous flower in a suspension element, is released for the time required to effect the takeover of the flower in the suspension element. In practice, all the suspension elements will be provided with such a lock.

To cause the feeding station to function optimally, both problems will have to be solved at least to a substantial extent. In a preferred embodiment, therefore, the measures according to the two above features will be taken simultaneously in the feeding station.

In a concrete embodiment the takeover of a flower from the guiding mechanism to the conveyor unit is realized because means are provided to determine that there is a flower near the takeover location at the end of the guiding mechanism, and because, furthermore, the actuator comprises a pushing element and an operating means engaging this, while, when there is a flower near the takeover location and as soon as a free suspension element has come before the takeover location, the flower is placed in the suspension element by means of the operating means engaging the pushing element. In particular, the actuator is also provided guiding elements to bring and keep, during a pushing movement in the direction of the conveyor unit, the end of the pushing element below the space of movement of the flowers in the guiding mechanism and to bring, during a retractive movement, the end of the pushing element at the side of this space to a condition of rest located there. As a result thereof, a flower with the stem can be moved without impediment through the guiding mechanism in the direction of the conveyor unit, while, when the stem has come near the takeover location, the end of the pushing element has been brought behind the stem to push it into a suspension element.

A favorable embodiment is obtained when the means for determining that there is a flower near the takeover location are formed by a detector arranged below the gilding mechanism. As soon as by means of this detector a flower has been observed at the takeover location, a free suspension element can be activated by means of a computer connected to the detector so as to take over the flower. This is rendered possible also according to the invention because a suspension element is provided with two retaining parts leaving a central opening clear, which can be moved from and towards each other, and because an operating means controlled by the computer is provided so as to move apart the retaining parts as Soon as a flower has been observed at the takeover location, and because the suspension element is further provided with spring means forming the lock so as to move the retaining parts towards each other again after a fixed time, during which time a flower can be placed between the retaining parts.

The invention will now be explained in more detail with reference to the accompanying drawing. In this drawing:

FIG. 1 is a perspective view of the feeding station according to the invention;

FIG. 2 is a perspective view of this feeding station, viewed from another angle;

FIG. 3 is a view of the actuator in this feeding station;

FIG. 4 is a view of a suspension element with operating means; and

FIG. 5 is a top view of this suspension element with operating means.

In the figures similar parts are denoted by the same reference numerals.

The feeding station according to the invention comprises a conveyor unit in the form of an endless chain with suspension elements 1 fixed thereon at discrete mutual distances. The suspension elements are fixed on the endless chain by means of connecting elements 2. The endless chain circulates in a horizontal plane in a manner as described in Netherlands patent application 10.2981. The text of this patent application is therefore considered to form part of the present application. In the suspension elements bulbous flowers, such as tulips, can be suspended with the bulbs upward. Provided at the side of the chain is a feeding unit 3 with a guiding mechanism 4, in which the tulips fed in an irregular manner, for instance by hand, can be fed to the chain with the bulbs upward and can be taken over by the chain in a regular manner. Of course, more of such feeding stations may be provided for transfer of bulbous flowers to the chain. The feeding unit 3 comprises sliding rods 5 and 6, between which the bulbous flowers can slide down with the bulbs upward, and a number of pair of pulleys 7, 8, 8*a*, 9*a* and 10, fitted on a frame not shown, which can be driven relative to each other by means of endless belts and driving means not shown, and between which the bulbous flowers can be fed in the direction of the chain where they can be taken over in the suspension elements 1. Situated between the pairs of pulleys 10 is the takeover location where the bulbous flowers are taken over in the suspension elements 1 from the guiding mechanism 4. Provided below belts between the pairs of pulleys 9a and 10 near the takeover location is a detector in the form of two detector elements 11 as to be able to determine that there is a flower near the takeover location. Of course, one single detector element may also be sufficient.

Provided below the guiding mechanism 4 is an actuator 12 so as to place the bulbous flowers in the suspension elements 1 of the conveyor unit while seizing the stems. The actuator 12 (see FIG. 3) comprises a pushing element 13 and an operating means in the form of operating cylinder 14 engaging the pushing element, as well as two fixedly arranged guiding elements 15 and 16 and a tiltably arranged guiding element 17. The housing of the operating cylinder and the guiding element are fastened to the frame of the guiding mechanism. The pushing element 13 is pivotably fitted in a point 18 beside the operating rod 19 of the operating cylinder 14. The pushing element 18 is further provided with a pin 20, which, in cooperation with the guiding elements 15-17, provide a proper movement of the pushing element 18 when the operating cylinder 14 is activated. In the condition of rest, that is to say the retracted condition of the operating cylinder 14, the pushing element 13 rests with the pin 20 against the guiding element 15. When the operating cylinder is then slid out, the pin 20 moves between the guiding elements 15 and 16 to the operating position, that is to say the position where the end of the pushing element is in the middle below the space between the last belts of the guiding mechanism. This movement is realized by a spring acting on the pushing element, which spring causes take pushing element to pivot about the pivot point 18 in the direction of the arrow P, as soon as the pin 20 is no longer retained by the guiding element 15. The pushing element can then be pushed further with the pin 20 along the guiding element 17 tiltable under spring action forward to below the takeover location. When retracting the operating cylinder 14, the pushing element 13, because the pin 20 moves outward against and along the guiding element 17 then blocked, is moved sideward, such that the end of the pushing element is no longer located below the space between the last belts of the guiding mechanism and this space is therefore free to guide a next flower. Via the guiding element 16 the pin 20 then strikes the guiding element 15 again, and the pushing element 13 therefore reaches the condition of rest again.

As soon as the detector has established that there is a flower near the takeover location, operating means are activated by the agency of a computer so as to realize the takeover, that is to say to release a suspension element and, after takeover of a flower, to block, that is to say to lock the suspension element again. If there is already a flower in a number of passing suspension elements, the above operating means can be activated by the computer only if a free suspension element comes to lie before the feeding unit 3. The guiding mechanism 8 must therefore be blocked meanwhile. The suspension elements are each provided with two retaining parts 21 and 22 leaving a central opening clear, which are pressed together by means of a spring 23 and can close the central opening. The two retaining parts are pivotable about axes 24 relative to the connecting element 2, which, as stated above, is fixed on the chain forming the conveyor unit. The retaining parts 21 and 22 are provided at the top with projecting parts 25, which, when pushing against them, ensure that the retaining parts 21 and 22 are moved apart about the axes 24, so that the suspension element is released. When the pressure against the projecting parts 25 is removed, the suspension element is blocked again under the action of the spring 23. The pressure on the projecting parts 25 is obtained with a pivotable plate 26 having a raised edge 27 and a computer-controlled operating means in the form of an operating cylinder 28 engaging the plate 26, the housing of which operating cylinder is fastened to the frame of the feeding unit. By activating the operating cylinder 28, the plate 26 can be rotated about the axis 29, such that in a first position the raised edge 27 is free from the projecting parts 25 and no pressure is there exerted on these parts, and that in a second position the projecting parts are pressed forwards by the raised edge 27 to move apart the parts 21 and 22, so that the suspension element is released. In this last position a flower can be pushed at the takeover location into the central opening of the retaining parts, after which the pushing element is retracted, the plate 26 is rotated upward so as to be free from the projecting parts and the retaining parts are pressed together again under the action of the spring, so that the suspension element is further blocked while enclosing a flower. Through the relatively large opening between the retaining parts 21 and 22 in case the suspension element is opened, the conveyor chain can be continuously moved, and flowers can then be shot into a released suspension element without bringing the conveyor chain to a standstill each time, because of which the flowers would otherwise be shaken too much.

The invention is not limited to the exemplary embodiment described herein with reference to the figures, but comprises all kinds of modifications thereof, of course as far as falling within the scope of protection of the appended claims. It is particularly pointed out that instead of the guiding mechanism described herein a guiding mechanism in the form of an accelerating mechanism as described in the above Netherlands Patent application 10.12981 may also be used. It is further observed that the above operating means may be formed by operating cylinders, among which hydraulic and pneumatic as well as electromechanical cylinders are reckoned. Different operating means are of course possible.

The invention claimed is:

1. A feeding station for processing bulbous flowers, comprising a conveyor unit with suspension elements provided at discrete mutual distances and at least one feeding unit with a guiding mechanism for guiding, for instance by hand, flowers suspended in the guiding mechanism with the bulbs upward to the conveyor unit and to take over the flowers therein in this position, characterized in that below the guiding mechanism an actuator is provided so as to be able to place the bulbous flowers in the suspension elements of the conveyor unit while seizing the stems, characterized in that means are provided to determine that there is a flower near the takeover location at the end of the guiding mechanism, and that, furthermore, the actuator comprises a pushing element and an operating means engaging this, while, when there is a flower near the takeover location and as soon as a free suspension element has come before the takeover location, the flower is placed in the suspension element by means of the operating means engaging the pushing element.

2. A feeding station according to claim 1, characterized in that the actuator is also provided with guiding elements to bring and keep, during a pushing movement in the direction of the conveyor unit, the end of the pushing element below the space of movement of the flowers in the guiding mechanism and to bring, during a refractive movement, the end of the pushing element at the side of this space to a condition of rest located there.

3. A feeding station according to claim 1, characterized in that the means or determining that there is a flower near the takeover location are formed by a detector arranged below the guiding mechanism.

4. A feeding station according to claim 3, characterized in that a computer is provided by means of which a free suspension element is activated for the takeover of the flower as soon as a flower has been observed at the takeover location.

5. A feeding station for processing bulbous flowers, comprising a conveyor unit with suspension elements provided at discrete mutual distances and at least one feeding unit with a guiding mechanism for guiding, for instance by hand, flowers suspended in the guiding mechanism with the bulbs upward to the conveyor unit and to take over the flowers therein in this position, characterized in that below the guiding mechanism an actuator is provided so as to be able to place the bulbous flowers in the suspension elements of the conveyor unit while seizing the stems, characterized in that a suspension element is provided with a lock, which, during the takeover of a bulbous flower in a suspension element, is released for the time required to effect the takeover of the flower in the suspension element, and further characterized in that the suspension element is provided with two retaining parts leaving a central opening clear, which can be moved from and towards each other, and that an operating means controlled by a computer is provided so as to move apart the retaining parts as soon as a flower has been observed at the takeover location, and that the suspension element is further provided with spring means forming the lock so as to move the retaining parts towards each other again after a fixed time, during which time a flower can be placed between the retaining parts.

\* \* \* \* \*